(No Model.)

W. JONES.
SAW FRAME.

No. 284,432. Patented Sept. 4, 1883.

Witnesses
George M. Harris
A. A. Basley

Inventor
Walter Jones
By Horace Harris
Atty

N. PETERS, Photo-Lithographer, Washington, D. C.

UNITED STATES PATENT OFFICE.

WALTER JONES, OF NEW YORK, N. Y.

SAW-FRAME.

SPECIFICATION forming part of Letters Patent No. 284,432, dated September 4, 1883.

Application filed March 7, 1883. (No model.)

*To all whom it may concern:*

Be it known that I, WALTER JONES, of New York, in the county and State of New York, have invented a new and useful Improvement in Saw-Frames, of which the following is a specification.

My invention relates to an improvement in saw-frames adapted for jewelers' use; and it consists in the ratchet-faced clamping-jaws, and in the jaws being thrown open by loosening the clamping-screw, substantially as hereinafter set forth.

Figure 1:
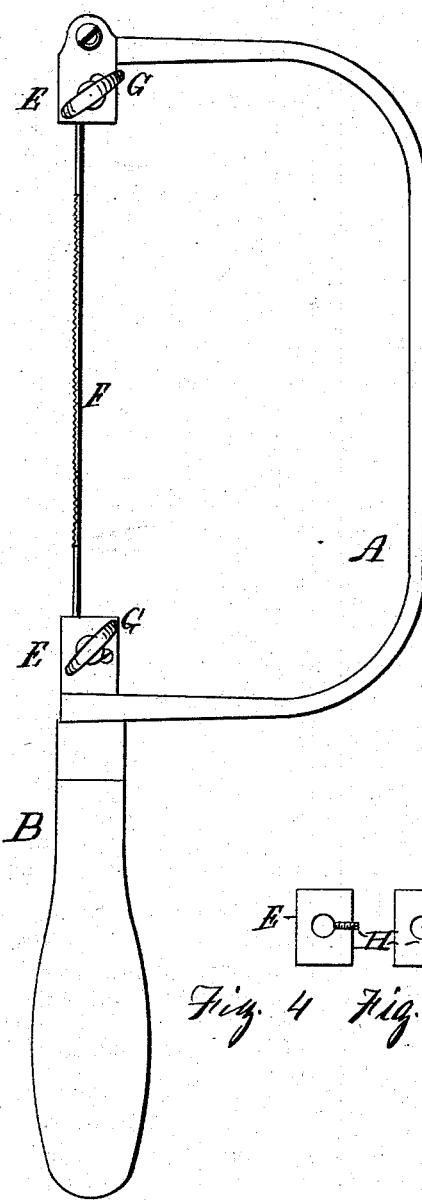
Figure 2:
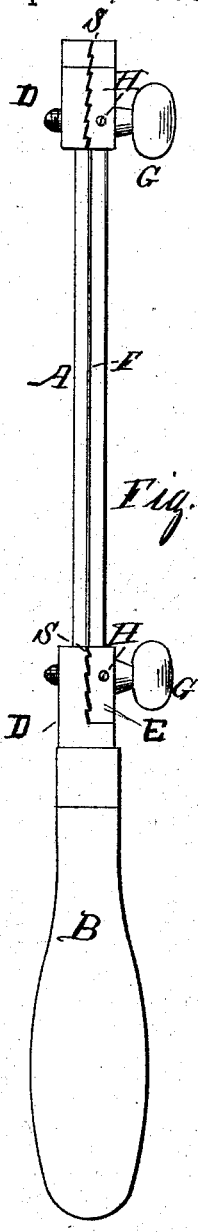
Figure 3:

Figure 1 is a side elevation. Fig. 2 is a front elevation. Figs. 3, 4, 5, 6, and 7 are detailed views.

In my construction I make my frame A of one piece of steel and carrying the handle B. The jaws for holding the saws are made from a portion, D, of the frame, making one part, and a loose plate, E, making the other part. These jaws are operated by means of the screw G, turning loose in the jaw E and operating by means of the screw-threaded jaw D. The jaws are cut with ratchet inside surfaces, S, adapted to fit into each other, but sufficiently blunted on the edges so as not to cut off the saw, and the saw F, put in between these jaws, is caught and held very firmly by means of the adjusting-screws G. In other frames, where there is only a roughening of the inner surfaces of the jaws, these surfaces in a little time get worn smooth, and the saw will get loose, which my ratchet-teeth effectually prevent, and thereby effect a great saving of strain on screws, which in the other forms have to be turned down very tightly and soon give out.

Figures 4, 5, 6, 7:
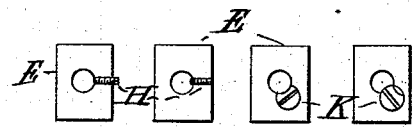

The jaw E may be made to be connected with the screw G by means of a set-screw, H, made to turn in the side of the jaw E, with the point adapted to pass into a neck or annular groove, I, in the side of the screw G; or, in place of the screws H, a screw, K, may be turned into the plate near the hole in the plate, having a semicircular notch cut out of the bead of it, so that when turned, as seen in Fig. 6, the screw G may be put through the plate, and then, the screw K turned partly around, the edge of the bead will catch in the groove I, the same as the end of the screw H. In either case the loosening of screw G carries the jaw E away from the jaw D, and allows the saw to be readily put in and taken out.

I claim—

1. The fixed jaw D, screw-threaded, and the loose jaw E, said jaws having ratchet-faced inner surfaces, and adapted, in combination with the screws G, to press the ends of the saw engaged between them into the same ratchet shapes and prevent them from slipping, substantially as specified.

2. The frame A, jaws D E, and screw G, provided at its neck with the annular groove I, in combination with a screw uniting the screw G with the jaw E, so that when the screw G is loosened the jaw D will by it be drawn off from jaw E to allow of inserting a saw between the jaws, substantially as set forth.

WALTER JONES.

Witnesses:
HORACE HARRIS,
GUY S. HARRIS,